US012785452B2

(12) United States Patent
Sadagopan et al.

(10) Patent No.: US 12,785,452 B2
(45) Date of Patent: Nov. 3, 2026

(54) SENSING FOR FAST TUNING OF RESONANT FREQUENCY IN A MULTI-STAGE RECTIFIER

(71) Applicant: QUALCOMM Incorporated, San Diego, CA (US)

(72) Inventors: Kamala Raghavan Sadagopan, San Diego, CA (US); Minghui Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 274 days.

(21) Appl. No.: 18/636,145

(22) Filed: Apr. 15, 2024

(65) Prior Publication Data

US 2025/0323572 A1 Oct. 16, 2025

(51) Int. Cl.

| | |
|---|---|
| ***H02J 50/20*** | (2016.01) |
| ***H02J 50/00*** | (2016.01) |
| ***H02J 50/12*** | (2016.01) |
| ***H02J 50/80*** | (2016.01) |
| ***H02M 7/25*** | (2006.01) |
| ***H04B 5/79*** | (2024.01) |

(52) U.S. Cl.

CPC ............ *H02J 50/20* (2016.02); *H02J 50/001* (2020.01); *H02J 50/12* (2016.02); *H02J 50/80* (2016.02); *H02M 7/25* (2013.01); *H04B 5/79* (2024.01)

(58) Field of Classification Search

CPC .......... H02J 50/001; H02J 50/10; H02J 50/12; H02J 50/20; H02J 50/80; H02M 7/10; H02M 7/103; H02M 7/19; H02M 7/2195; H02M 7/25; H04B 5/79

See application file for complete search history.

(56) References Cited

U.S. PATENT DOCUMENTS

| | | | | |
|---|---|---|---|---|
| 3,419,786 | A * | 12/1968 | Brane | H02M 7/19 363/68 |
| 9,490,725 | B2 * | 11/2016 | Xia | H02M 7/25 |
| 2015/0043260 | A1 * | 2/2015 | Liu | H02M 7/219 363/127 |
| 2019/0334384 | A1 | 10/2019 | Yase et al. | |
| 2024/0039327 | A1 * | 2/2024 | Noghabaei | H03H 7/40 |
| 2024/0266971 | A1 * | 8/2024 | Al-Absi | H02M 7/2195 |
| 2025/0233452 | A1 * | 7/2025 | Al-Absi | H02J 50/001 |

OTHER PUBLICATIONS

International Search Report and Written Opinion—PCT/US2025/017498—ISA/EPO—Jun. 2, 2025.

(Continued)

*Primary Examiner* — Levi Gannon

(74) *Attorney, Agent, or Firm* — Patterson + Sheridan LLP

(57) ABSTRACT

Certain aspects of the present disclosure are directed towards an apparatus for signal rectification. The apparatus generally includes: a multi-stage rectifier comprising a first rectifier stage, a second rectifier stage, and a third rectifier stage coupled to an output of the multi-stage rectifier, wherein the second rectifier stage is coupled between the first rectifier stage and the third rectifier stage; and a sample and tune circuit comprising a sampling input coupled to an output of the second rectifier stage and an output coupled to at least one tuning input of the multi-stage rectifier.

20 Claims, 8 Drawing Sheets

(56) References Cited

OTHER PUBLICATIONS

Stoopman M., et al., "Co-Design of a CMOS Rectifier and Small Loop Antenna for Highly Sensitive RF Energy Harvesters", IEEE Journal of Solid-state Circuits, vol. 49, No. 3, Mar. 1, 2014, pp. 622-634, XP011541964, the whole document.

Sadagopan K.R., et al., "A 2.4-GHz Wideband Wireless Harvester With Integrated Autonomous RF Input-Frequency Tracking for FCC-Compatible Chip-Scale Battery Charging", IEEE Open Journal of the Solid-State Circuits Society ( vol. 3), Oct. 11, 2023, pp. 249-261.

* cited by examiner

SENSING FOR FAST TUNING OF RESONANT FREQUENCY IN A MULTI-STAGE RECTIFIER

BACKGROUND

Field of the Disclosure

Aspects of the present disclosure relate to wireless communications, and more particularly, to techniques for signal rectification.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, further improvements in wireless communications systems may be made to overcome the aforementioned technical challenges and others.

SUMMARY

Certain aspects of the present disclosure are directed towards an apparatus for signal rectification. The apparatus generally includes: a multi-stage rectifier comprising a first rectifier stage, a second rectifier stage, and a third rectifier stage coupled to an output of the multi-stage rectifier, wherein the second rectifier stage is coupled between the first rectifier stage and the third rectifier stage; and a sample and tune circuit comprising a sampling input coupled to an output of the second rectifier stage and an output coupled to at least one tuning input of the multi-stage rectifier.

Certain aspects of the present disclosure are directed towards a method for signal rectification. The method generally includes: rectifying an input signal via a multi-stage rectifier, wherein the multi-stage rectifier comprises a first rectifier stage, a second rectifier stage, and a third rectifier stage coupled to an output of the multi-stage rectifier, wherein the second rectifier stage is coupled between the first rectifier stage and the third rectifier stage; sampling a voltage at an output of the second rectifier stage; and tuning the multi-stage rectifier based on the sampled voltage.

Certain aspects of the present disclosure are directed towards a wireless device. The wireless device generally includes: an antenna; a multi-stage rectifier comprising a first rectifier stage coupled to the antenna, a second rectifier stage coupled to the antenna, and a third rectifier stage coupled to the antenna and to an output of the multi-stage rectifier, wherein the second rectifier stage is coupled between the first rectifier stage and the third rectifier stage; and a sample and tune circuit comprising a sampling input coupled to an output of the second rectifier stage and an output coupled to at least one tuning input of the multi-stage rectifier.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
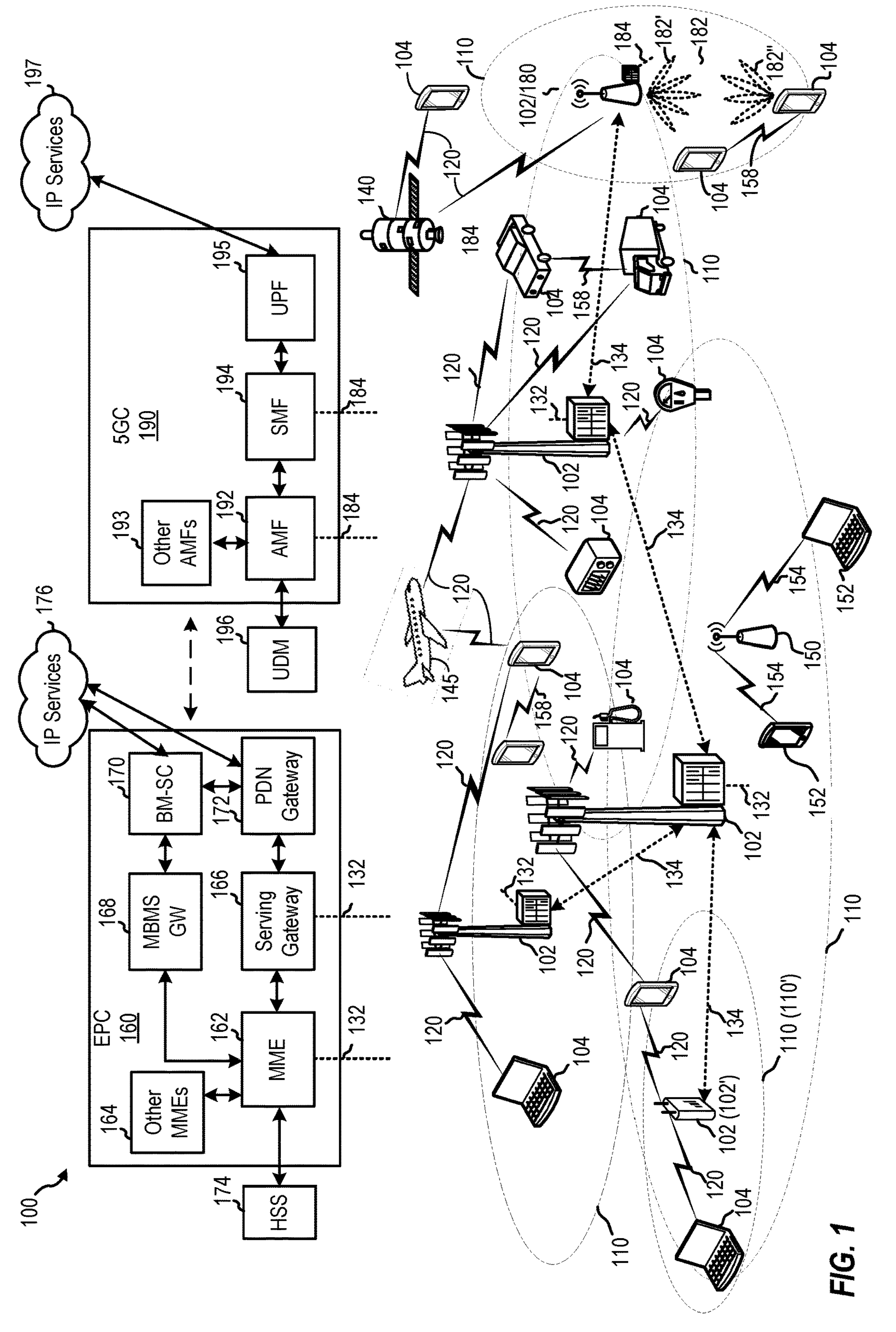
FIG. 1 depicts an example wireless communications network.

Certain aspects of the present disclosure are directed towards techniques for sampling a voltage of a multi-stage rectifier for tuning. For example, the multi-stage rectifier may be implemented using a chain complementary metal-oxide-semiconductor (CMOS) rectifiers. For example, a first CMOS rectifier may be coupled between a reference potential node (electrical ground) and a reference node of a second CMOS rectifier. The second CMOS rectifier may be coupled between the first CMOS rectifier and a reference node of a third CMOS rectifier, and so on until the last CMOS rectifier in the chain that is coupled to an output of the multi-stage rectifier. In other words, the multi-stage rectifier may include a chain of n rectifiers, n being an integer greater than two.

Some aspects of the present disclosure are directed towards sampling an output voltage of the CMOS rectifier n−1 (e.g., the CMOS rectifier that is second to the last in the chain of rectifiers). The CMOS rectifiers 1 to n−1 apply a gain to generate the output voltage sampled for tuning, allowing for more accurate and efficient sampling of the voltage for tuning the multi-stage rectifier. Moreover, the output voltage of the CMOS rectifier n−1 settles more quickly (e.g., in response to a change in the input signal frequency, a change in input impedance, process variations, or during the bootup of a device including the multi-stage rectifier) as compared to the output voltage of the last CMOS rectifier in the chain (e.g., the output of CMOS rectifier n, which is also the output of the multi-stage rectifier). Therefore, the multi-stage rectifier may be tuned more quickly, facilitating a more efficient operation compared to some conventional implementations. In other words, the CMOS rectifier n−1 may provide the second highest output voltage of the CMOS rectifier chain, but also has a smaller output capacitance (e.g., parasitic capacitance) allowing for faster sensing of the response of the rectifier to tune the multi-stage rectifier.

While some aspects are directed towards sampling the output voltage of CMOS rectifier n−1, the output voltage of any one of the other CMOS rectifiers in the chain may be sampled in some cases. For example, the output voltage of any one of CMOS rectifiers 2 to n−1 may be sampled based on consideration of a tradeoff between the gain applied to generate the sampled output voltage and the speed of the tuning of the multi-stage rectifier, as described in more detail herein.

In some cases, the multi-stage rectifier may be used for energy harvesting. A new generation of wireless devices may overcome conventional drawbacks of onboard energy storage by harvesting energy from wireless signals (e.g., radio frequency (RF) signals) to perform various circuit operations such as wireless communications. Such energy harvesting devices (e.g., user equipment (UE)) may include, for example, RFID devices (e.g., RFID tags) that are capable of receiving signals and "backscattering" these received signals to another device to perform wireless communications. RFID devices are generally categorized into three type of devices: passive, semi-passive, and active. Passive RFID devices typically have no energy storage and communicate via backscattering. Semi-passive RFID devices have limited energy storage and communicate via backscattering. Active RFID devices have energy storage and are capable of active transmission (generating RF signals).

These aforementioned passive and semi-passive RFID devices may rely partially or entirely on harvested energy from received signals to perform wireless communications (e.g., via backscattering signals). Thus, energy-harvesting (EH) devices (e.g., passive internet of things (IoT)/ambient IoT devices) may be considered a type of UE that provides low-cost and low-power solutions for many applications in a wireless communications system.

In some use cases, EH is used for tasks like data decoding, data reception, data encoding, and data transmission. In such cases, the EH device may have a small energy storage unit to store the harvested energy, and the stored energy may be used to perform data decoding, encoding, filtering, processing, and the like. In other cases, the purpose is not to charge a phone battery in full, but to charge the battery of a device (such as a wearable, smartwatch, or UE with low power or use a dedicated battery for EH) in a way that enables some tasks to be performed using the harvested energy. Various tasks such as data decoding, operating some filters, data encoding, transmitting, or receiving data may be performed through the accumulation of energy harvested over time. In some cases, the EH mode of operation can occur when a UE battery is at low levels, and energy-harvesting modes can be used. In some cases, the EH device can work in low-power modes by the UE or when the UE decides to use such low-power modes.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
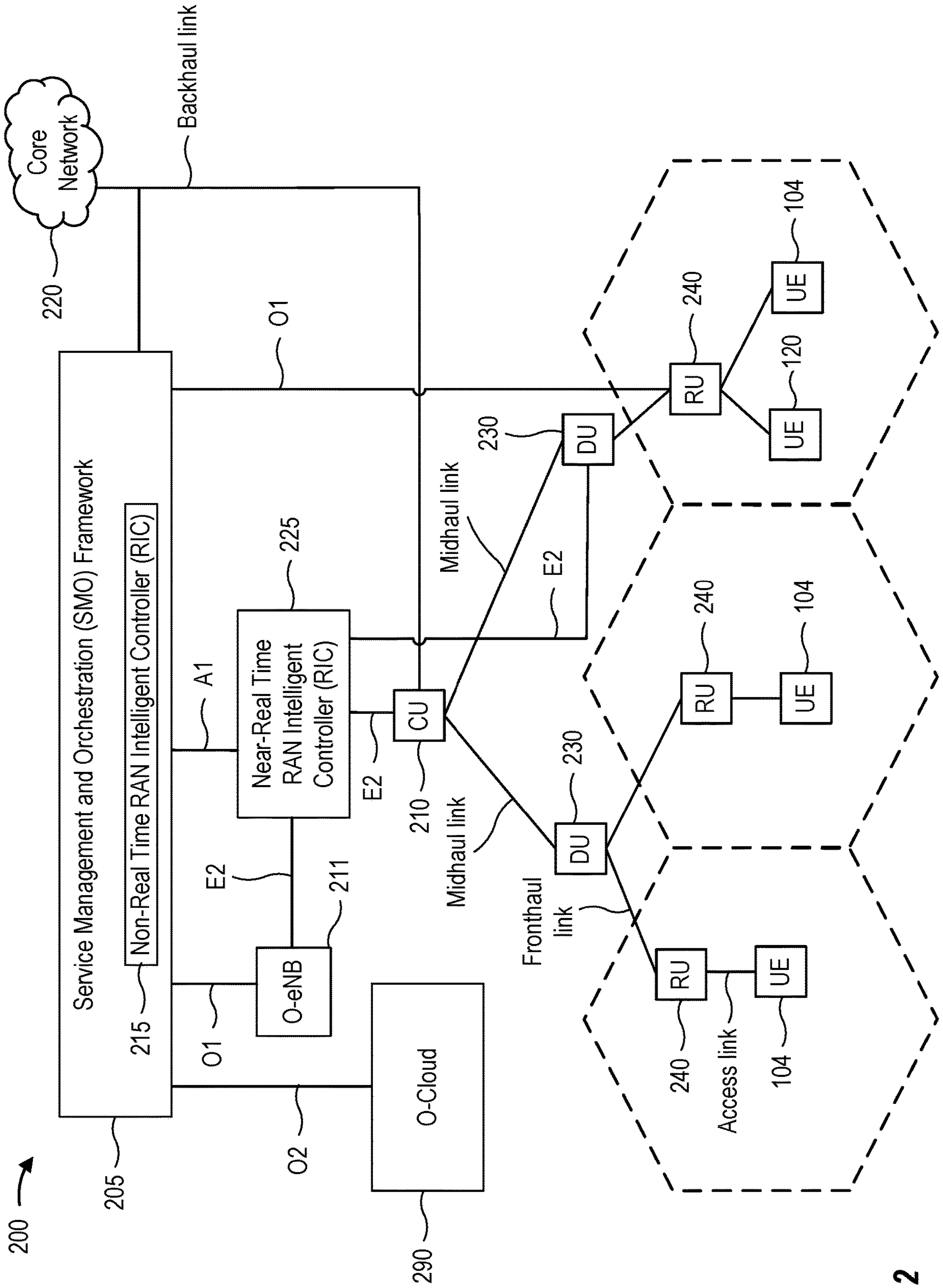
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G New Radio (NR) or Next Generation RAN (NG-RAN)) may interface with 5GC network 190 through second backhaul links 184. BSs 102 may communicate directly or indirectly (e.g., through the EPC 160 or 5GC network 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz." Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting MBMS-related charging information.

5GC network 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC network 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC network 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230 for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a VRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, artificial intelligence/machine learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
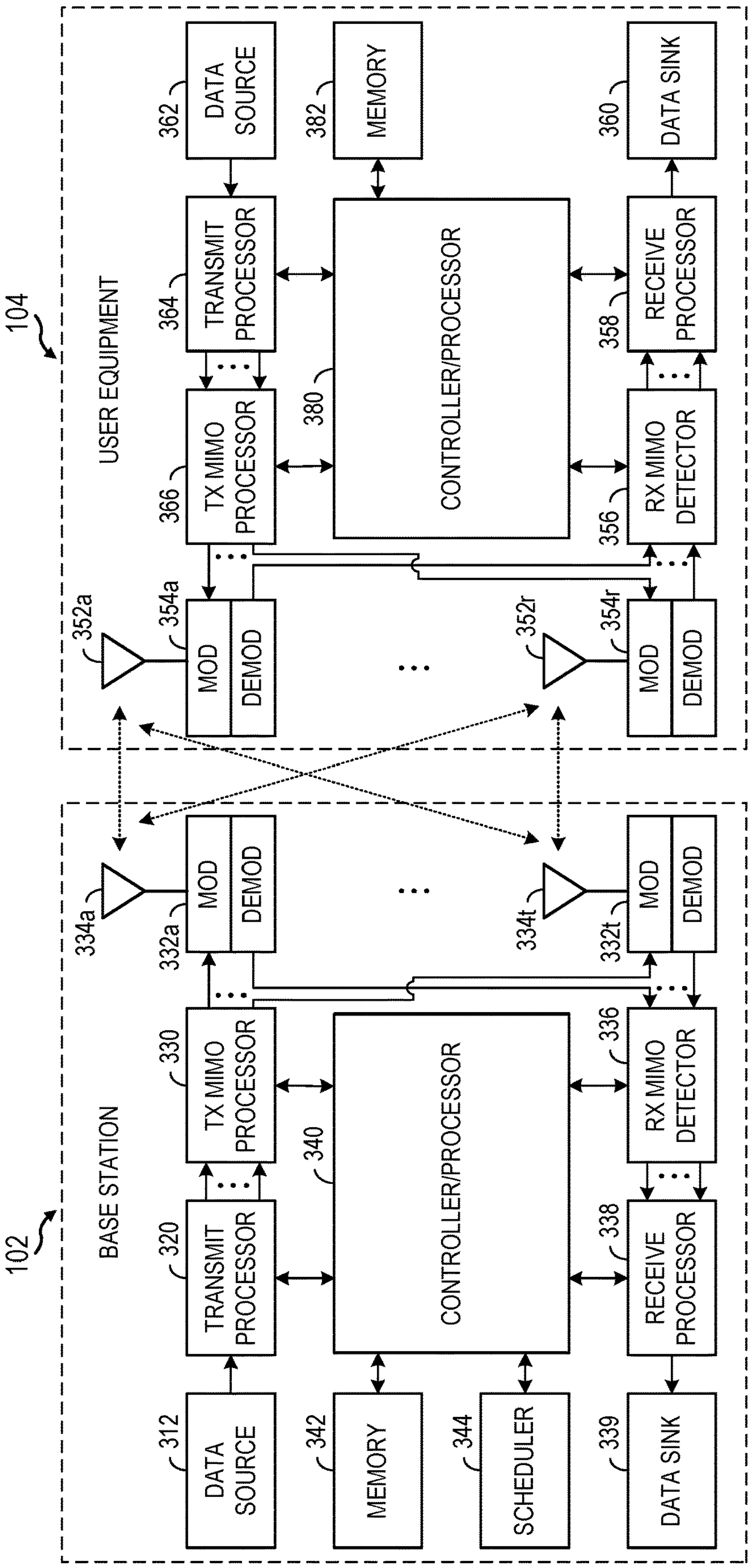
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively "antennas 334"), transceivers 332*a-t* (collectively "transceivers 332"), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively "antennas 352"), transceivers 354*a-r* (collectively "transceivers 354"), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the physical uplink shared channel (PUSCH)) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, receive (RX) MIMO detector 336, controller/ processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
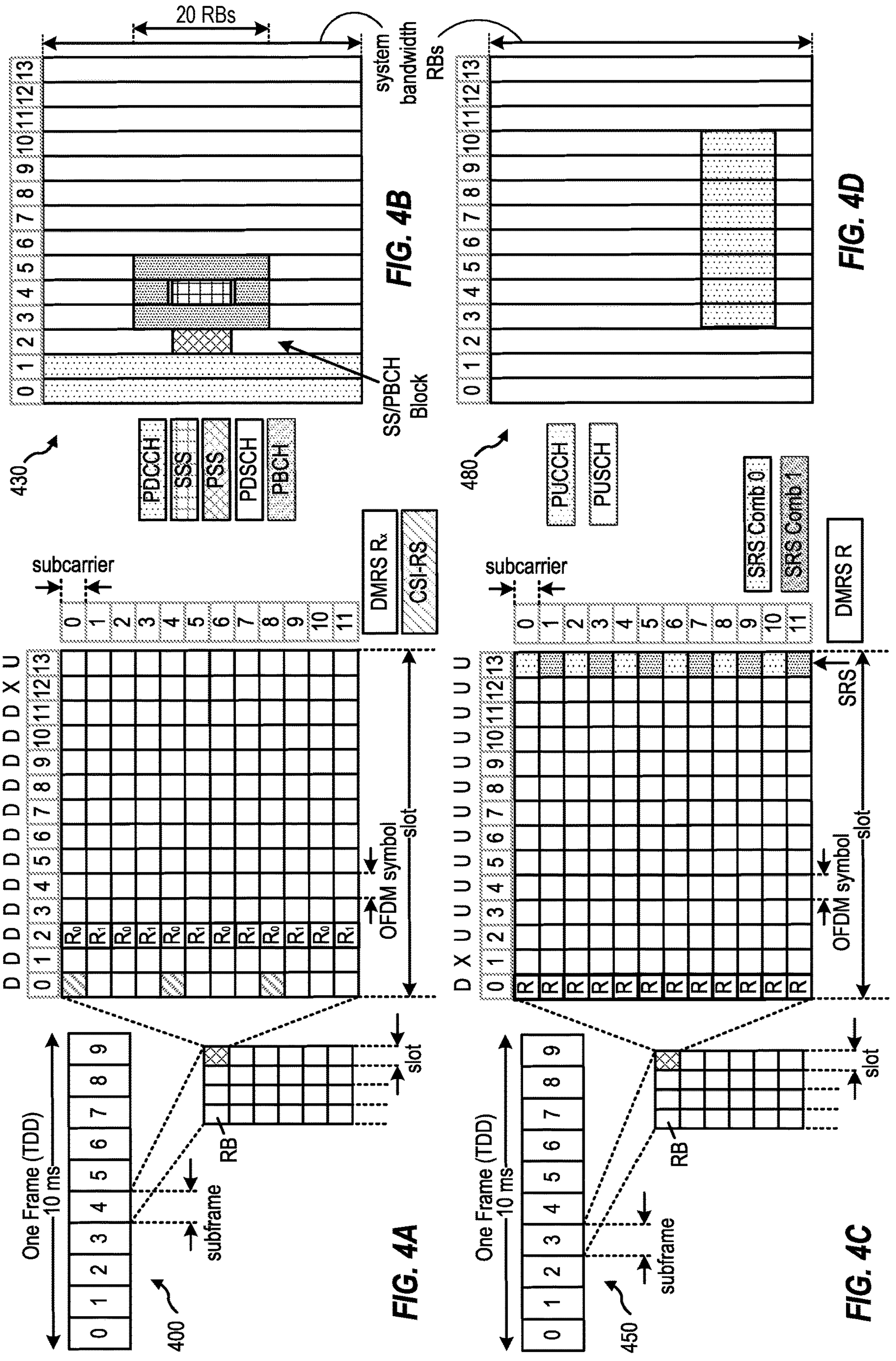
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times15$ kHz, where μ is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledged/not acknowledged (ACK/NACK) feedback. The PUSCH carries data, and may additionally be used to carry a buffer status report (BSR), a power headroom report (PHR), and/or UCI.

Introduction to Energy Harvesting in RFID Systems

Radio frequency identification (RFID) is a rapidly growing technology impacting many industries due to its economic potential for inventory/asset management within warehouses, internet of things (IoT), sustainable sensor networks in factories and/or agriculture, and smart homes, to name a few example applications. RFID technology includes RFID devices (or backscatter devices), such as transponders, or tags, that emit an information-bearing signal upon receiving an energizing signal.

In certain aspects, RFID devices may be operated without a battery. Generally, RFID devices that are operated without a battery are known as passive RFID devices. Passive RFID devices may operate by harvesting energy from received radio frequency signals (e.g., "over the air"), thereby powering reception and transmission circuitry within the RFID devices. This harvested energy allows passive RFID devices to transmit information, sometimes referred to as backscatter-modulated information, without using a local power source within the RFID device. On the other hand, in certain aspects, an RFID device may be semi-passive and include on-board energy storage to supplement the RFID device's ability to harvest energy from received signals (however, at higher cost).

In certain aspects, in addition to harvesting power from RF sources, energy-harvesting devices may accumulate energy from other direct energy sources, such as solar energy, in order to supplement these devices' power demands. Semi-passive energy-harvesting devices may, in some cases, include power-consuming components, such as analog-to-digital converters (ADCs), mixers, and oscillators.

Thus, RFID devices are a type of user equipment (UE) that provides low-cost and low-power solutions for many applications in a wireless communications system. Such devices may be power efficient, sometimes consuming less than 0.1 mW of power to operate. Further, their relatively simple architectures and, in some cases, lack of battery, mean that such devices can be small, lightweight, and easily installed or integrated in many types of environments or host devices. Generally speaking then, RFID devices provide practical solutions to many networking applications that use low-cost, small-footprint, durable, maintenance-free, and long-lifespan communications devices. For example, RFID devices may be configured as long endurance industrial sensors, which mitigate the problems of replacing batteries in and around dangerous machinery.

Figure 5:
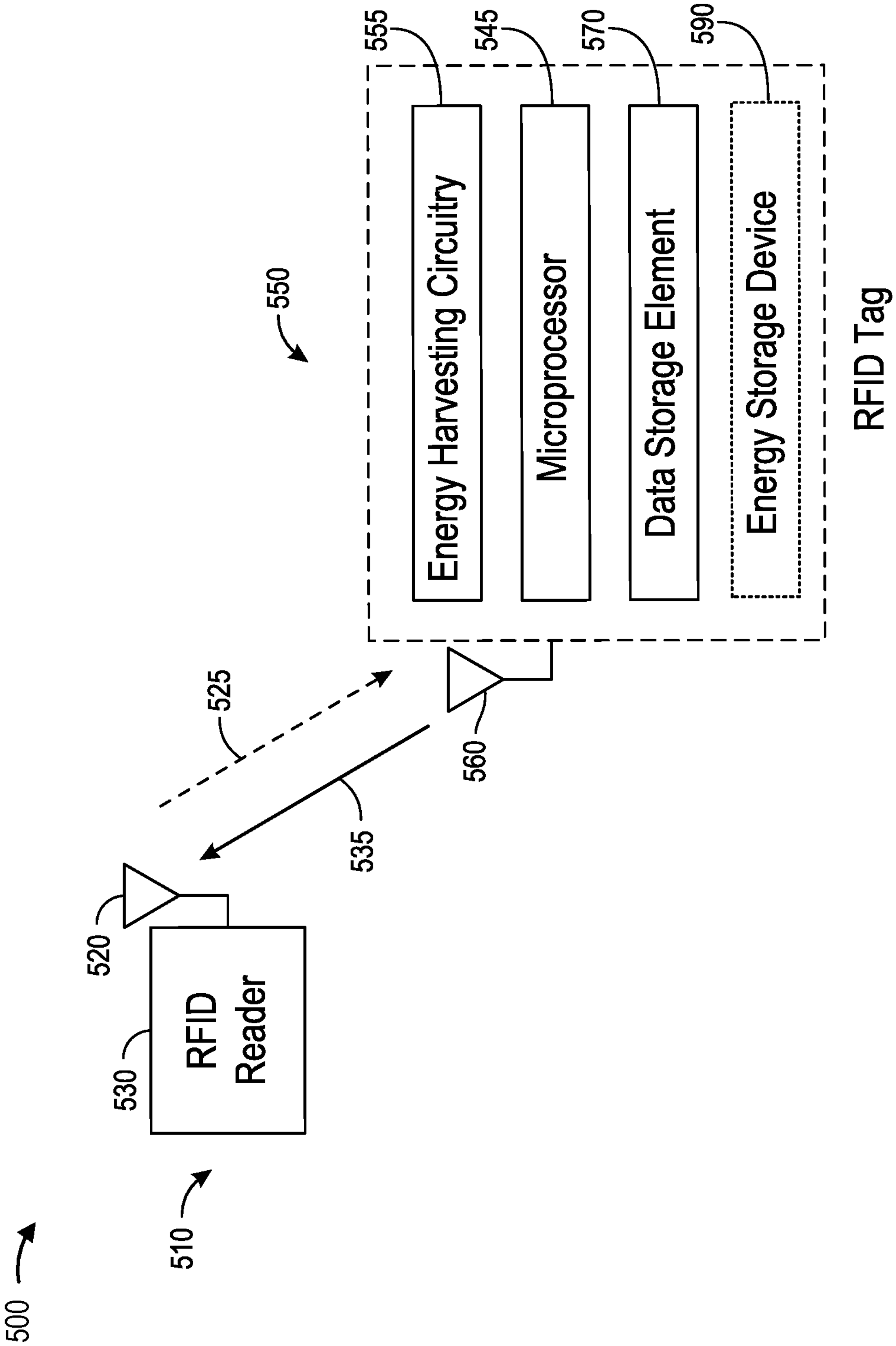
FIG. 5 depicts an example radio frequency identification (RFID) system.

FIG. 5 shows an example RFID system 500. As shown, RFID system 500 includes a reader 510 and an RFID tag 550. Reader 510 may also be referred to as an interrogator or a scanner. RFID tag 550 may also be referred to as an interrogator, RFID label, or an electronics label. In certain aspects, reader 510 is a network entity (e.g., such as a gNB), and RFID tag 550 is a user equipment (UE).

Reader 510 includes an antenna 520 and an electronics unit 530. Antenna 520 radiates signals transmitted by reader 510 and receives signals from RFID tags and/or other devices. Electronics unit 530 may include a transmitter and a receiver for reading RFID tags such as RFID tag 550. The same pair of transmitter and receiver (or another pair of transmitter and receiver) may support bi-directional communication with wireless networks, wireless devices, etc. Electronics unit 530 may include processing circuitry (e.g., a processor) to perform processing for data being transmitted and received by the RFID reader 510.

As shown, RFID tag 550 includes an antenna 560 and a data storage element 570. Antenna 560 radiates signals transmitted by RFID tag 550 and receives signals from RFID reader 510 and/or other devices. Data storage element 570 stores information for RFID tag 550, for example, in an electrically erasable programmable read-only memory (EEPROM) or another type of memory. RFID tag 550 may also include an electronics unit that can process the received signal and generate the signals to be transmitted.

In certain aspects, RFID tag 550 may be a passive RFID tag having no battery. In this case, induction may be used to power the RFID tag 550. For example, in some cases, a magnetic field from a signal transmitted by reader 510 may induce an electrical current in RFID tag 550, which may then operate based on the induced current. RFID tag 550 can radiate its signal in response to receiving a signal from RFID reader 510 or some other device. In certain other aspects, RFID tag 550 may optionally include an energy storage device 590, such as a battery, capacitor, etc., for storing energy harvested using energy harvesting circuitry 555, as described below.

In one example, RFID tag 550 may be read by placing the reader 510 within close proximity to RFID tag 550. Reader 510 may radiate a first signal 525 via the antenna 520. In some cases, the first signal 525 may be known as an interrogation signal or energy signal. In some cases, energy of the first signal 525 may be coupled from reader antenna 520 to RFID tag antenna 560 via magnetic coupling and/or other phenomena. In other words, the RFID tag 550 may receive the first signal 525 from reader 510 via antenna 560, and energy of the first signal 525 may be harvested using energy harvesting circuitry 555 (e.g., an RF transducer) and used to power RFID tag 550. For example, energy of the first signal 525 received by RFID tag 550 may be used to power a microprocessor 545 of RFID tag 550. Microprocessor 545 may, in turn, retrieve information stored in the data storage element 570 of RFID tag 550 and the antenna 560 transmits the retrieved information via a second signal 535. For example, in some cases, microprocessor 545 may generate the second signal 535 by modulating a baseband signal (e.g., generated using energy of the first signal 525) with the information retrieved from the data storage element 570. In some cases, this second signal 535 may be known as a backscatter modulated information signal. Thereafter, as noted, microprocessor 545 provides the second signal 535 to reader 510. Reader 510 may receive the second signal 535 from RFID tag 550 via antenna 520 and may process (e.g., demodulate) the received signal to obtain the information of data storage element 570 sent in second signal 535.

In some cases, RFID system 500 may be designed to operate at 13.56 MHz or some other frequency (e.g., an ultra-high frequency (UHF) band at 900 MHz). Reader 510 may have a specified maximum transmit power level, which may be imposed by the Federal Communication Commission (FCC) in the United Stated or other regulatory bodies in other countries. The specified maximum transmit power level of reader 510 may limit the distance at which RFID tag 550 can be read by reader 510.

Wireless technology is increasingly useful in industrial applications, such as ultra-reliable low-latency communication (URLLC) and machine type communication (MTC). In such domains, and others, it is desirable to support devices (e.g., passive RFID tags) that are capable of harvesting energy from wireless energy sources (e.g., in lieu of or in combination with a battery or other energy storage device, such as a capacitor), such as RF signals, thermal energy, solar energy, and the like.

Figure 6:
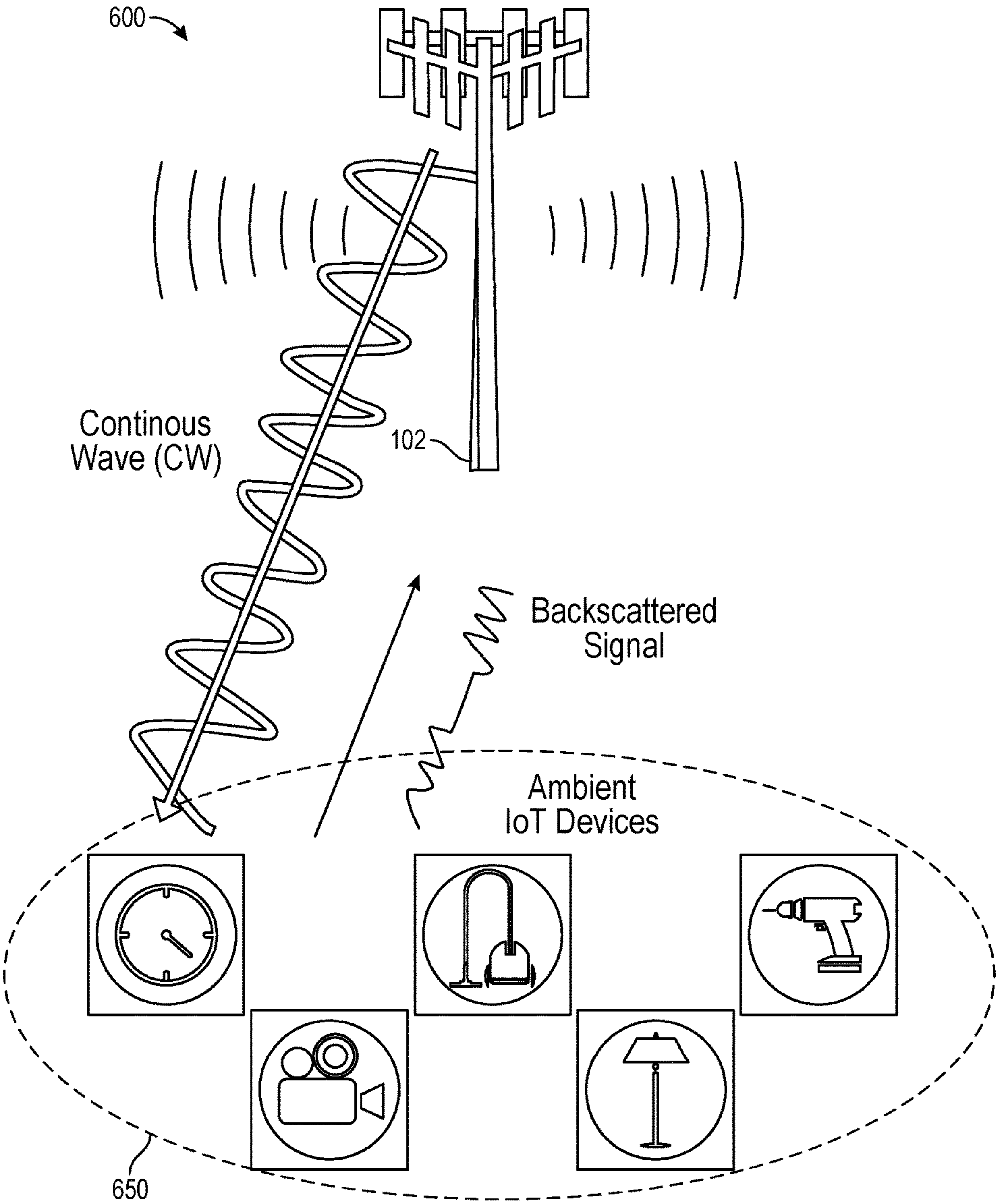
FIG. 6 depicts an example system that utilizes a network entity to communicate with ambient internet of things (IoT) devices.

FIG. 6 depicts an example system 600 that utilizes a network entity (e.g., BS 102) to communicate with ambient IoT devices 650. The ambient IoT devices 650 may be used to monitor a variety of devices and processes. For example, IoT devices may be used to report sensor measurements, video signals/images, light readings, and control devices (e.g., actuators).

Typical networks may not be able to efficiently support the most pervasive RFID-type of sensors, implemented as passive IoT devices. Such devices may be used extensively in future use cases, such as asset management, logistics, warehousing, and manufacturing.

As illustrated in FIG. 6, a gNB may be able to read information stored on ambient IoT devices and/or write information to ambient IoT devices. The gNB can provide energy to the ambient IoT devices (e.g., via a continuous wave signal) and an information-bearing signal may be reflected back ("backscattered) to the gNB. The gNB may read the reflected signal from the ambient IoT device to decode the information transmitted by the IoT devices 650.

Aspects Related to Signal Rectification

Harvested-energy-powered tags have several uses, including inventory management, asset tracking, humidity sensing, and environmental monitoring. Having a high-quality-factor (high-Q) energy harvester is beneficial for tag sensitivity, achieving long-range operation, and potentially ambient harvesting. Certain aspects of the present disclosure are directed towards techniques for sampling a node of a rectifier to tune the rectifier. Having a node that can be sensed quickly is beneficial for adding features such as maximum power point tracking, input frequency tracking (e.g., opportunistic energy harvesting from a strong source), and for enhancing harvester sensitivity, to name a few.

In radio frequency (RF) energy harvesters with high-Q antenna-rectifier designs, the rectifier resonance frequency is not tuned to the RF input frequency during the cold start of the device. The rectifier's high-Q and resultant high sensitivity may be specific to a narrow bandwidth in high-Q energy harvesters. Therefore, a tuning capacitor bank (e.g., tuned using a code) may be used to adjust for changes in the rectifier resonant frequency due to, for example, changes in the impedance of the environment or process variations. However, sensing the output voltage of the rectifier to tune the capacitor bank may be slow due to a large capacitance at the rectifier output.

Figure 7:
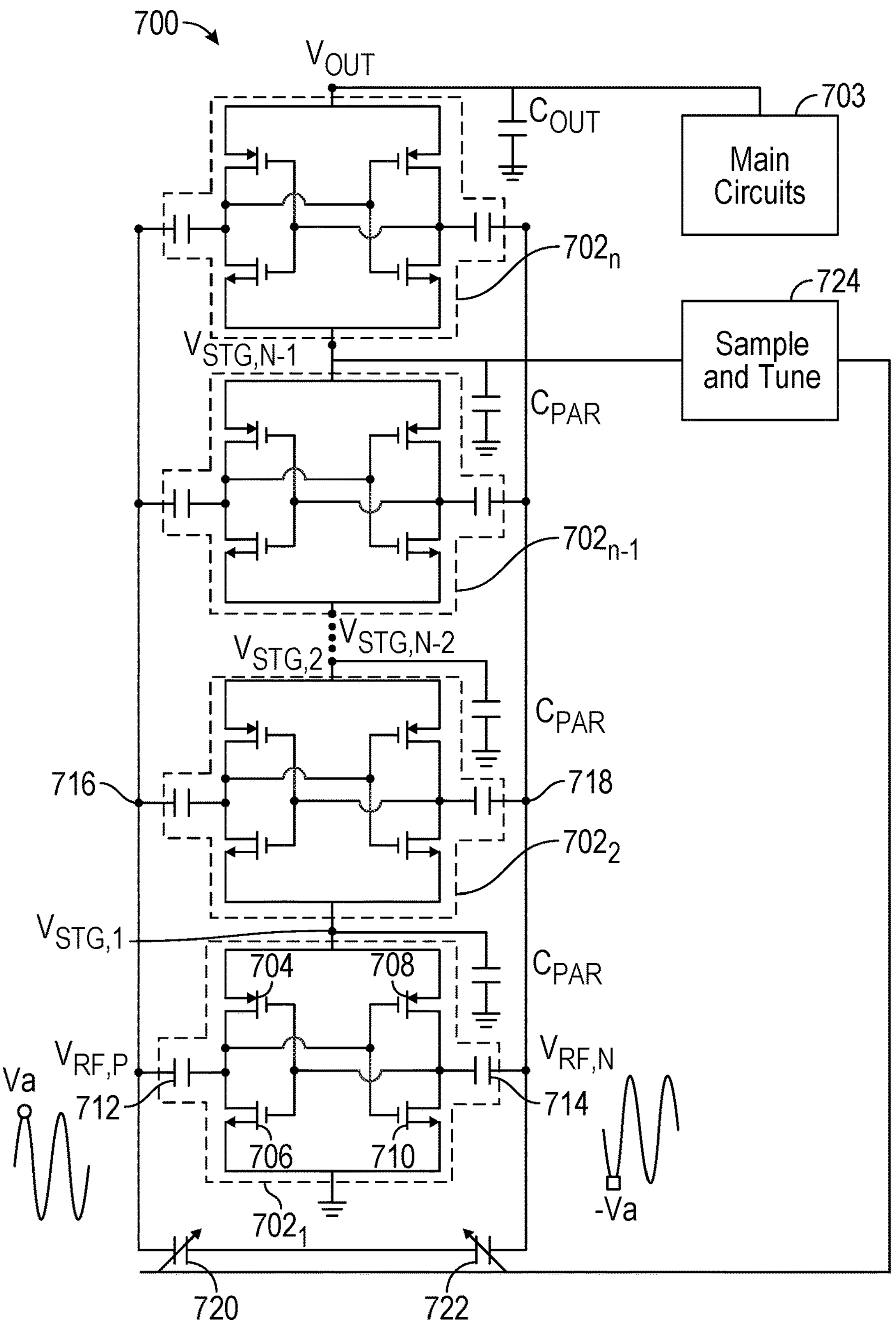
FIG. 7 illustrates an example multi-stage rectifier, in accordance with certain aspects of the present disclosure.

FIG. 7 illustrates an example of a multi-stage rectifier 700 for energy harvesting, in accordance with certain aspects of the present disclosure. The multi-stage rectifier 700 may be part of the energy harvesting circuitry 555 of FIG. 5.

As shown in FIG. 7, the multi-stage rectifier 700 may include multiple complementary metal-oxide-semiconductor (CMOS) rectifiers 702$_1$ to 702$_n$ (collectively referred to as "CMOS rectifiers 702"). As shown, an output capacitive element ($C_{OUT}$) may be coupled to an output voltage ($V_{OUT}$) node of the multi-stage rectifier 700. A circuit 703 (e.g., also referred to as "main circuits") to be powered may be coupled to the $V_{OUT}$ node, as shown. $C_{OUT}$ may be a large capacitive element (e.g., have a capacitance of 1 μF).

As shown, the CMOS rectifiers may include back-to-back inverters. For example, a first inverter may be implemented using transistors 704, 706, and a second inverter may be implemented using transistors 708, 710, in rectifier 702$_1$. The gates of transistors 704, 706 form an input of the first inverter and are coupled to drains of transistors 708, 710 forming an output of the second inverter. The gates of transistors 708, 710 form an input of the second inverter and are coupled to drains of transistors 704, 706 forming an output of the first inverter. As shown, a positive RF input node 716 (e.g., providing a positive RF voltage labeled "$V_{RF,P}$") may be AC-coupled to the drains of transistors 704, 706 through a capacitive element 712 of the rectifier 702$_1$. A negative RF input node 718 (e.g., providing a negative RF voltage labeled "$V_{RF,N}$") may be AC-coupled to the drains of transistors 708, 710 through a capacitive element 714 of the rectifier 702$_1$.

$V_{RF,P}$ and $V_{RF,N}$ form a differential input signal to be rectified via the multi-stage rectifier 700. For example, the differential input signal may be received via the antenna 560 described with respect to FIG. 5 for energy harvesting. As shown in FIG. 7, the sources of transistors 706, 710 may be coupled to a reference potential node (e.g., electric ground), and the sources of transistors 704, 708 may be coupled to an output node of rectifier 702$_1$ providing a first stage voltage labeled "$V_{STG,1}$." Each of the CMOS rectifiers 702 is implemented using a similar architecture as the rectifier 702$_1$ to generate respective stage voltages labeled "$V_{STG,1}$" to "$V_{STG,N-1}$" As shown, the output node of one rectifier (e.g., rectifier 702$_1$) serves as a reference potential node for the rectifier chain's subsequent rectifier (e.g., rectifier 702$_2$). The output node of rectifier 702$_n$ serves as the $V_{OUT}$ node of the multi-stage rectifier 700. As shown, parasitic capacitive elements labeled "$C_{PAR}$" may be effectively coupled to each of the output nodes of the rectifiers 702.

The multi-stage rectifier 700 may include variable capacitive elements 720, 722 (e.g., capacitor banks) coupled between the positive RF input node 716 and the negative RF input node 718. A sample and tune circuit 724 may be used to sample a stage output voltage of the multi-stage rectifier 700 and tune the multi-stage rectifier 700 by adjusting the capacitances of capacitive elements 720, 722 (e.g., via tuning inputs of capacitive elements 720, 722 or capacitor banks).

For sampling and tuning, the large output capacitance (e.g., of $C_{OUT}$) of the multi-stage rectifier 700 results in charging and settling times that can last as long as a few seconds. For instance, upon booting up a device including the rectifier 700, a few tens of seconds may pass to allow $V_{OUT}$ (e.g., the rectified output voltage) to settle before sampling (sensing) $V_{OUT}$ and tuning the rectifier 700. Some aspects of the present disclosure are directed towards techniques for tuning the rectifier 700 more quickly. For example, in some aspects, instead of sensing $V_{OUT}$ at the output of rectifier 702$_n$, a different node of the rectifier 700 that provides faster settling may be sensed. For instance, the sample and tune circuit 724 may include a sampling input coupled to the output of rectifier 702$_{n-1}$ and used to sense the voltage $V_{STG,N-1}$ at the output of rectifier 702$_{n-1}$, as shown. In this manner, tuning the capacitive elements 720, 722 may be performed more quickly (e.g., using a finite state machine), providing a high-Q interface and increased sensitivity (e.g., of about 6-10 dB)) for energy harvesting. The sensitivity is a measure of the minimum RF power for energy harvesting that allows for device operations.

Due to a smaller capacitance at the output of rectifier $\mathbf{702}_{n-1}$ compared to the output of rectifier $\mathbf{702}_n$, sensing the voltage $V_{STG,N-1}$ at the output of rectifier $\mathbf{702}_{n-1}$ enables sampling without waiting a long time for settling. If sampling were to be performed at the output of rectifier $\mathbf{702}_n$, the circuit 703 and the $C_{OUT}$ may be decoupled from the rectifier 700 during the sampling. By sampling the output of rectifier $\mathbf{702}_{n-1}$, such time sharing between powering the circuit 703 and the sampling may not be performed. Thus, the sampling and tuning do not impede the operations of the circuit 703.

Each stage (CMOS rectifier) of the multi-stage rectifier 700 applies a gain to the differential input voltage with reference to an output voltage of a previous stage. For instance, rectifier $\mathbf{702}_2$ may rectify the differential input signal to generate $V_{STG,2}$ with reference to the output voltage ($V_{STG,1}$) of rectifier $\mathbf{702}_1$. Thus, $V_{STG,1}$ may have the lowest magnitude, $V_{STG,2}$ may have the second lowest magnitude, and so on. For example, assume the amplitude of the differential input signal is Va, as shown. In this case, $V_{STG,1}$ may be a rectified direct-current (DC) voltage with a magnitude 2Va, $V_{STG,2}$ may be a rectified DC voltage with a magnitude 4Va, and so on. Thus, sensing the voltage $V_{STG,N-1}$ at the output of rectifier $\mathbf{702}_{n-1}$ provides more accurate and efficient sensing due to the magnitude of the voltage $V_{STG,N-1}$ being greater as compared to the output voltage (e.g., $V_{STG,N-1}$) of preceding stages of the rectifier 700.

That said, the preceding stages of the rectifier 700 provide faster output voltage settling, as described herein. For instance, $V_{STG,N-1}$ may settle faster than $V_{STG,N}$, and $V_{STG,N-2}$ (e.g., $V_{STG,2}$) may settle faster than $V_{STG,N-1}$. Therefore, sensing $V_{STG,N-1}$ provides faster settling and tuning than sensing $V_{STG,N}$. Similarly, sensing $V_{STG,N-2}$ provides faster tuning compared to sensing $V_{STG,N-1}$. Therefore, there is a tradeoff between sampling efficiency (e.g., by sampling a stage output providing a higher gain) and tuning speed (e.g., by sensing a stage output providing faster settling).

While the example multi-stage rectifier 700 is shown with at least four rectifier stages, the aspects of the present disclosure may be implemented with any number of rectifier stages (e.g., three or more rectifier stages). For instance, with three rectifier stages, the sample and tune circuit 724 may sample the output voltage ($V_{STG,2}$) of CMOS rectifier $\mathbf{702}_2$.

Example Operations for Signal Rectification

Figure 8:
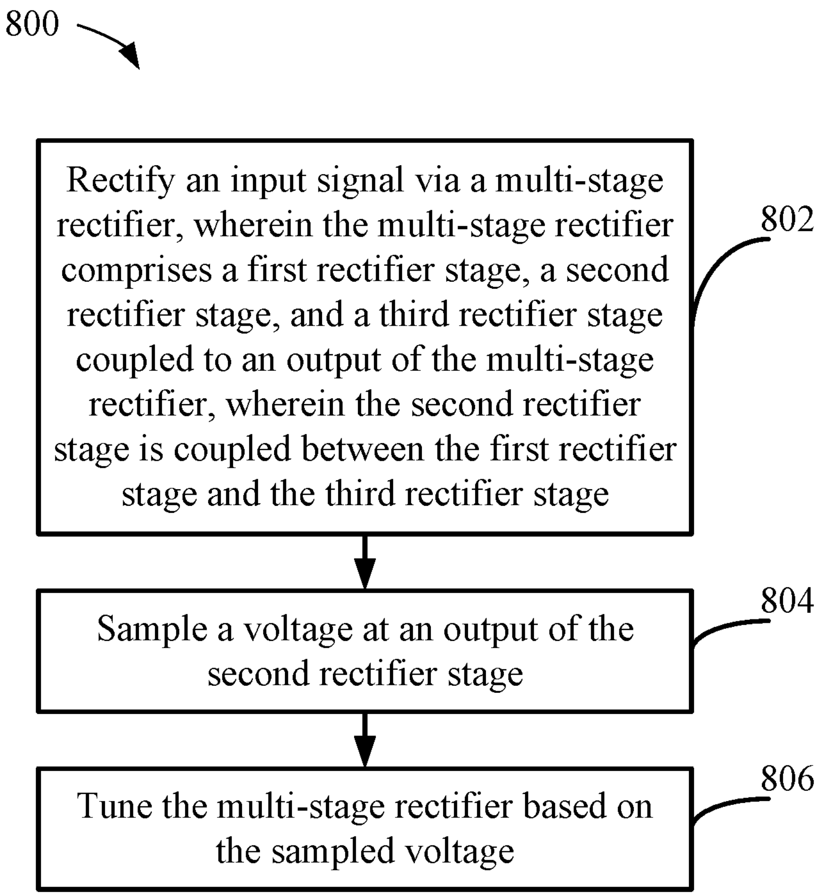
FIG. 8 illustrates example operations for signal rectification, in accordance with certain aspects of the present disclosure.

FIG. 8 is a flow diagram illustrating example operations 800 for signal rectification, in accordance with certain aspects of the present disclosure. The operations 800 may be performed by a multi-stage rectifier, such as the multi-stage rectifier 700 of FIG. 7.

At block 802, the multi-stage rectifier may rectify an input signal (e.g., $V_{RF,P}$ and $V_{RF,N}$). In some aspects, the multi-stage rectifier may receive the input signal via an antenna. The multi-stage rectifier may include a first rectifier stage (e.g., CMOS rectifier $\mathbf{702}_1$), a second rectifier stage (e.g., one or more CMOS rectifiers $\mathbf{702}_2$ to $\mathbf{702}_{n-1}$), and a third rectifier stage (e.g., CMOS rectifier $\mathbf{702}_n$) coupled to an output (e.g., $V_{OUT}$ node) of the multi-stage rectifier. The second rectifier stage may be coupled between the first rectifier stage and the third rectifier stage. In some aspects, the multi-stage rectifier may also include at least one fourth rectifier stage (e.g., CMOS rectifier $\mathbf{702}_2$) coupled between the first rectifier stage and the second rectifier stage. In some aspects, the output of the second rectifier stage (e.g., CMOS rectifier $\mathbf{702}_{n-1}$) is directly coupled to a reference node of the third rectifier stage. The multi-stage rectifier may also include an output capacitive element ($C_{OUT}$) coupled to the output of the third rectifier stage. Each of the first rectifier stage, the second rectifier stage, and the third rectifier stage may be coupled between differential input nodes (e.g., input nodes 716, 718) of the multi-stage rectifier.

At block 804, the multi-stage rectifier may sample a voltage at an output of the second rectifier stage. At block 806, the multi-stage rectifier may tune the multi-stage rectifier based on the sampled voltage. In some aspects, tuning the multi-stage rectifier may include adjusting a capacitance of each of one or more capacitive elements (e.g., capacitive elements 720, 722) coupled between differential input nodes of the multi-stage rectifier.

Each of the first rectifier stage, the second rectifier stage, and the third rectifier stage may include a first transistor (e.g., transistor 704), a second transistor (e.g., transistor 706) having a drain coupled to a drain of the first transistor, a third transistor (e.g., transistor 708), and a fourth transistor (e.g., transistor 710) having a drain coupled to a drain of the third transistor and to gates of the first transistor and the second transistor. Gates of the third transistor and the fourth transistor may be coupled to the drains of the first transistor and the second transistor. A first capacitive element (e.g., capacitive element 712) may be coupled between a first input (e.g., input node 716) of the multi-stage rectifier and the drains of the first transistor and the second transistor. A second capacitive element (e.g., capacitive element 714) may be coupled between a second input of the multi-stage rectifier and the drains of the third transistor and the fourth transistor.

EXAMPLE CLAUSES

Aspect 1: An apparatus for signal rectification, comprising: a multi-stage rectifier comprising a first rectifier stage, a second rectifier stage, and a third rectifier stage coupled to an output of the multi-stage rectifier, wherein the second rectifier stage is coupled between the first rectifier stage and the third rectifier stage; and a sample and tune circuit comprising a sampling input coupled to an output of the second rectifier stage and an output coupled to at least one tuning input of the multi-stage rectifier.

Aspect 2: The apparatus of Aspect 1, wherein the multi-stage rectifier further comprises at least one fourth rectifier stage coupled between the first rectifier stage and the second rectifier stage.

Aspect 3: The apparatus of Aspect 1 or 2, wherein the output of the second rectifier stage is directly coupled to a reference node of the third rectifier stage.

Aspect 4: The apparatus according to any of Aspects 1-3, wherein each of the first rectifier stage, the second rectifier stage, and the third rectifier stage comprises a complementary metal-oxide-semiconductor (CMOS) rectifier.

Aspect 5: The apparatus according to any of Aspects 1-4, wherein the multi-stage rectifier further comprises one or more capacitive elements coupled between differential input nodes of the multi-stage rectifier, wherein the output of the sample and tune circuit is coupled to one or more control inputs of the one or more capacitive elements.

Aspect 6: The apparatus according to any of Aspects 1-5, wherein the multi-stage rectifier further comprises an output capacitive element coupled to the output of the third rectifier stage.

Aspect 7: The apparatus according to any of Aspects 1-6, wherein each of the first rectifier stage, the second rectifier stage, and the third rectifier stage is coupled between differential input nodes of the multi-stage rectifier.

Aspect 8: The apparatus according to any of Aspects 1-7, wherein each of the first rectifier stage, the second rectifier stage, and the third rectifier stage comprises: a first transistor; a second transistor having a drain coupled to a drain of the first transistor; a third transistor; a fourth transistor having a drain coupled to a drain of the third transistor and to gates of the first transistor and the second transistor, wherein gates of the third transistor and the fourth transistor are coupled to the drains of the first transistor and the second transistor; a first capacitive element coupled between a first input of the multi-stage rectifier and the drains of the first transistor and the second transistor; and a second capacitive element coupled between a second input of the multi-stage rectifier and the drains of the third transistor and the fourth transistor.

Aspect 9: The apparatus according to any of Aspects 1-8, wherein the multi-stage rectifier is configured to rectify a signal received via an antenna to generate a rectified output voltage for powering one or more circuits.

Aspect 10: A method for signal rectification, comprising: rectifying an input signal via a multi-stage rectifier, wherein the multi-stage rectifier comprises a first rectifier stage, a second rectifier stage, and a third rectifier stage coupled to an output of the multi-stage rectifier, wherein the second rectifier stage is coupled between the first rectifier stage and the third rectifier stage; sampling a voltage at an output of the second rectifier stage; and tuning the multi-stage rectifier based on the sampled voltage.

Aspect 11: The method of Aspect 10, wherein the multi-stage rectifier further comprises at least one fourth rectifier stage coupled between the first rectifier stage and the second rectifier stage.

Aspect 12: The method of Aspect 10 or 11, wherein the output of the second rectifier stage is directly coupled to a reference node of the third rectifier stage.

Aspect 13: The method according to any of Aspects 10-12, wherein each of the first rectifier stage, the second rectifier stage, and the third rectifier stage comprises a complementary metal-oxide-semiconductor (CMOS) rectifier.

Aspect 14: The method according to any of Aspects 10-13, wherein tuning the multi-stage rectifier comprises adjusting a capacitance of each of one or more capacitive elements coupled between differential input nodes of the multi-stage rectifier.

Aspect 15: The method according to any of Aspects 10-14, wherein each of the first rectifier stage, the second rectifier stage, and the third rectifier stage is coupled between differential input nodes of the multi-stage rectifier.

Aspect 16: The method according to any of Aspects 10-15, wherein each of the first rectifier stage, the second rectifier stage, and the third rectifier stage comprises: a first transistor; a second transistor having a drain coupled to a drain of the first transistor; a third transistor; a fourth transistor having a drain coupled to a drain of the third transistor and to gates of the first transistor and the second transistor, wherein gates of the third transistor and the fourth transistor are coupled to the drains of the first transistor and the second transistor; a first capacitive element coupled between a first input of the multi-stage rectifier and the drains of the first transistor and the second transistor; and a second capacitive element coupled between a second input of the multi-stage rectifier and the drains of the third transistor and the fourth transistor.

Aspect 17: The method according to any of Aspects 10-16, further comprising receiving the input signal via an antenna.

Aspect 18: The method according to any of Aspects 10-17, wherein rectifying the input signal via the multi-stage rectifier generates a rectified output voltage and wherein the method further comprises powering one or more circuits with the rectified output voltage.

Aspect 19: A wireless device, comprising: an antenna; a multi-stage rectifier comprising a first rectifier stage coupled to the antenna, a second rectifier stage coupled to the antenna, and a third rectifier stage coupled to the antenna and to an output of the multi-stage rectifier, wherein the second rectifier stage is coupled between the first rectifier stage and the third rectifier stage; and a sample and tune circuit comprising a sampling input coupled to an output of the second rectifier stage and an output coupled to at least one tuning input of the multi-stage rectifier.

Aspect 20: The wireless device of Aspect 19, wherein the multi-stage rectifier further comprises at least one fourth rectifier stage coupled between the first rectifier stage and the second rectifier stage.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for signal rectification, comprising:

a multi-stage rectifier comprising a first rectifier stage, a second rectifier stage, and a third rectifier stage coupled to an output of the multi-stage rectifier, wherein the second rectifier stage is coupled between the first rectifier stage and the third rectifier stage; and a sample and tune circuit comprising a sampling input coupled to an output of the second rectifier stage and an output coupled to at least one tuning input of the multi-stage rectifier, the sample and tune circuit being configured to sample an output voltage of the second rectifier stage provided to the sampling input.

2. The apparatus of claim 1, wherein the multi-stage rectifier further comprises at least one fourth rectifier stage coupled between the first rectifier stage and the second rectifier stage.

3. The apparatus of claim 1, wherein the output of the second rectifier stage is directly coupled to a reference node of the third rectifier stage.

4. The apparatus of claim 1, wherein each of the first rectifier stage, the second rectifier stage, and the third rectifier stage comprises a complementary metal-oxide-semiconductor (CMOS) rectifier.

5. The apparatus of claim 1, wherein the multi-stage rectifier further comprises one or more capacitive elements coupled between differential input nodes of the multi-stage rectifier, wherein the output of the sample and tune circuit is coupled to one or more control inputs of the one or more capacitive elements.

6. The apparatus of claim 1, wherein the multi-stage rectifier further comprises an output capacitive element coupled to the output of the third rectifier stage.

7. The apparatus of claim 1, wherein each of the first rectifier stage, the second rectifier stage, and the third rectifier stage is coupled between differential input nodes of the multi-stage rectifier.

8. The apparatus of claim 1, wherein each of the first rectifier stage, the second rectifier stage, and the third rectifier stage comprises:

a first transistor;

a second transistor having a drain coupled to a drain of the first transistor;

a third transistor;

a fourth transistor having a drain coupled to a drain of the third transistor and to gates of the first transistor and the second transistor, wherein gates of the third transistor and the fourth transistor are coupled to the drains of the first transistor and the second transistor;

a first capacitive element coupled between a first input of the multi-stage rectifier and the drains of the first transistor and the second transistor; and a second capacitive element coupled between a second input of the multi-stage rectifier and the drains of the third transistor and the fourth transistor.

9. The apparatus of claim 1, wherein the multi-stage rectifier is configured to rectify a signal received via an antenna to generate a rectified output voltage for powering one or more circuits.

10. A method for signal rectification, comprising:

rectifying an input signal via a multi-stage rectifier, wherein the multi-stage rectifier comprises a first rectifier stage, a second rectifier stage, and a third rectifier stage coupled to an output of the multi-stage rectifier, wherein the second rectifier stage is coupled between the first rectifier stage and the third rectifier stage;

sampling a voltage at an output of the second rectifier stage; and tuning the multi-stage rectifier based on the sampled voltage.

11. The method of claim 10, wherein the multi-stage rectifier further comprises at least one fourth rectifier stage coupled between the first rectifier stage and the second rectifier stage.

12. The method of claim 10, wherein the output of the second rectifier stage is directly coupled to a reference node of the third rectifier stage.

13. The method of claim 10, wherein each of the first rectifier stage, the second rectifier stage, and the third rectifier stage comprises a complementary metal-oxide-semiconductor (CMOS) rectifier.

14. The method of claim 10, wherein tuning the multi-stage rectifier comprises adjusting a capacitance of each of one or more capacitive elements coupled between differential input nodes of the multi-stage rectifier.

15. The method of claim 10, wherein each of the first rectifier stage, the second rectifier stage, and the third rectifier stage is coupled between differential input nodes of the multi-stage rectifier.

16. The method of claim 10, wherein each of the first rectifier stage, the second rectifier stage, and the third rectifier stage comprises:

a first transistor;

a second transistor having a drain coupled to a drain of the first transistor;

a third transistor;

a fourth transistor having a drain coupled to a drain of the third transistor and to gates of the first transistor and the second transistor, wherein gates of the third transistor and the fourth transistor are coupled to the drains of the first transistor and the second transistor;

a first capacitive element coupled between a first input of the multi-stage rectifier and the drains of the first transistor and the second transistor; and a second capacitive element coupled between a second input of the multi-stage rectifier and the drains of the third transistor and the fourth transistor.

17. The method of claim 10, further comprising receiving the input signal via an antenna.

18. The method of claim 10, wherein rectifying the input signal via the multi-stage rectifier generates a rectified output voltage and wherein the method further comprises powering one or more circuits with the rectified output voltage.

19. A wireless device, comprising:

an antenna;

a multi-stage rectifier comprising a first rectifier stage coupled to the antenna, a second rectifier stage coupled to the antenna, and a third rectifier stage coupled to the antenna and to an output of the multi-stage rectifier, wherein the second rectifier stage is coupled between the first rectifier stage and the third rectifier stage; and a sample and tune circuit comprising a sampling input coupled to an output of the second rectifier stage and an output coupled to at least one tuning input of the multi-stage rectifier, the sample and tune circuit being configured to sample an output voltage of the second rectifier stage provided to the sampling input.

20. The wireless device of claim 19, wherein the multi-stage rectifier further comprises at least one fourth rectifier stage coupled between the first rectifier stage and the second rectifier stage.

* * * * *